Patented Aug. 31, 1926.

1,597,860

UNITED STATES PATENT OFFICE.

NORMAN BROCKLEHURST MAURICE AND WILLIAM FROST, OF MACCLESFIELD, ENGLAND.

MANUFACTURE OF ARTIFICIAL GUT OR ANIMAL FIBERS OF A LIKE NATURE.

No Drawing. Application filed October 31, 1924, Serial No. 747,127, and in Great Britain December 11, 1923.

This invention relates to the manufacture of a substitute for gut and other animal products of a like nature applicable for various commercial purposes.

According to the invention a number of ends or threads of natural silk are treated or saturated with a solution of gelatinous substance and rubber latex, twisted together and hardened or rendered water-resisting by formaldehyde chrome alum or the like either with or without vulcanizing.

In carrying out the invention a bath is prepared of a solution of gelatine, glue, casein, albuminoids or the like (or a mixture of these) with which is incorporated rubber latex in a fluid state containing 25% to 32% of rubber.

As an example:—

Gelatine 3 to 6 ozs., water 1 quart, heated until dissolved; rubber latex (25% to 30%) 2 to 6 quarts, slowly added and stirred until incorporated.

A number of ends or threads of natural silk, after being degummed, (the number of ends or threads depending on the thickness of string required) are drawn or passed or immersed in the bath at a temperature of say about 120° to 140° F. until saturated and then twisted together.

The twisting of the ends or threads may be effected as they are drawn through the bath or after they leave the bath when partially dry but while sufficient of the solution adheres to them to cause them to stick together. Any excess of the gelatine-latex solution may be wiped off and the strings allowed to dry.

For many purposes we prefer to employ the ends of degummed silk but for other purposes especially where thicker strings are desired, threads or ends of other fibers may be employed with the silk.

The strings either before or after they have been dried are treated with a solution of formaldehyde, chrome alum or the like to harden them or render them water resisting either by passing them through a solution or spraying it upon them.

The strings of artificial gut so produced may be vulcanized if desired by any suitable vulcanizing process such as by applying a vulcanizer to the gelatine-latex solution.

If coloured strings are required, the degummed silk or other fibers are dyed to the required shade previous to the treatment described in the above invention.

In some cases, however, it is advisable to add a small amount of dyestuff to the gelatine-latex solution.

By this invention a resilient string will be produced suitable as a substitute for gut for many purposes, stronger and more durable than ordinary gut and which will not be susceptible to atmospheric changes.

It may be applied to such purposes as rackets for tennis, badminton and the like, nets such as tennis nets, garden nets and the like, fishing lines and the like and various other commercial purposes.

What we claim as our invention and desire to protect by Letters Patent is:—

1. A process for the production of a substitute for gut and other animal fibers of a like nature consisting in treating threads of natural silk with a solution of a gelatinous substance and rubber latex, twisting the threads of silk together whilst the solution is moist and treating them with a water-resisting material to render them waterproof.

2. A process for the production of a substitute for gut and other animal fibers of a like nature consisting in treating threads of natural silk with a solution of a gelatinous substance and rubber latex, twisting the threads of silk together whilst the solution is moist, treating them with a water-resisting material to render them waterproof and finally vulcanizing the fibers.

3. A process for the production of a substitute for gut and other animal fibers of a like nature consisting in treating threads of natural silk with a solution of gelatinous substance and rubber latex, twisting the threads of silk together whilst the solution is moist and treating them with formaldehyde to render them waterproof.

4. A process for the production of a substitute for gut and other animal fibers of a like nature consisting in treating threads of natural silk with a solution of gelatinous substance and rubber latex, twisting the threads of silk together whilst the solution is moist, treating them with formaldehyde to render them waterproof and finally vulcanizing the fibers.

5. A substitute for gut and other animal fibers comprising silk threads, impregnated with a solution of a gelatinous substance and rubber latex, twisted together whilst moist and rendered waterproof by treatment with a water-resisting material.

6. A substitute for gut and other animal fibers comprising silk threads, impregnated with a solution of a gelatinous substance and rubber latex, twisted together whilst moist, rendered waterproof by treatment with a water resisting material and finally vulcanized.

7. A substitute for gut comprising silk threads, a composition of gelatine and rubber latex with which the threads are impregnated, and formaldehyde by which the composition is rendered waterproof.

In testimony whereof we have hereunto set our hands.

NORMAN B. MAURICE.
WM. FROST.